(12) United States Patent
Dale

(10) Patent No.: US 8,019,630 B2
(45) Date of Patent: Sep. 13, 2011

(54) DYNAMIC SERVICE SCHEDULING

(75) Inventor: Jonathan Dale, San Francisco, CA (US)

(73) Assignee: Fujitsu Limited, Kawasaki (JP)

( * ) Notice: Subject to any disclaimer, the term of this patent is extended or adjusted under 35 U.S.C. 154(b) by 1872 days.

(21) Appl. No.: 10/608,876

(22) Filed: Jun. 27, 2003

(65) Prior Publication Data

US 2004/0267555 A1 Dec. 30, 2004

(51) Int. Cl.
*G06Q 10/00* (2006.01)

(52) U.S. Cl. .................... 705/5; 705/1.1; 705/6

(58) Field of Classification Search ............... 705/5–6, 705/1.1
See application file for complete search history.

(56) References Cited

U.S. PATENT DOCUMENTS

| | | | |
|---|---|---|---|
| 5,948,040 A * | 9/1999 | DeLorme et al. | 701/201 |
| 2001/0005831 A1* | 6/2001 | Lewin et al. | 705/5 |
| 2002/0082877 A1* | 6/2002 | Schiff et al. | 705/5 |
| 2004/0236616 A1* | 11/2004 | Daughtrey | 705/5 |
| 2004/0249684 A1* | 12/2004 | Karppinen | 705/5 |
| 2006/0212321 A1* | 9/2006 | Vance et al. | 705/5 |
| 2006/0287897 A1* | 12/2006 | Sobalvarro et al. | 705/5 |
| 2008/0010105 A1* | 1/2008 | Rose et al. | 705/5 |

OTHER PUBLICATIONS

Cirillo, Rich, "A Hole In One", Apr. 3, 2000, VAR Business, p. 46.*
Clark, Elizabeth, "Lesson 157: The Resource Reservation Protocol (RSVP)", Aug. 1, 2001, Network Magazine, p. 24.*
Dale et al., "Pizza and a Movie: A Case Study in Advanced Web Services," ACM Autonomous Agents and Multi-Agents System '02 Conference, 5 pages, Jul. 15, 2002.

* cited by examiner

*Primary Examiner* — Fadey S Jabr
(74) *Attorney, Agent, or Firm* — Baker Botts L.L.P.

(57) ABSTRACT

A system includes a number of services and agents interconnected by a communication network. A consumer agent identifies a template specifying one or more events for a task. The consumer agent implements an iterative process in which the template may be further defined and/or refined to provide links to one or more of the services that provide features for fulfilling events within an itinerary.

8 Claims, 2 Drawing Sheets

DYNAMIC SERVICE SCHEDULING

TECHNICAL FIELD OF THE INVENTION

The present invention relates generally to event scheduling and, more particularly, to dynamic service scheduling using intelligent agents.

BACKGROUND OF THE INVENTION

The introductions of the internet and worldwide web have unleashed a flood of information. Users can now obtain unparalleled access to information and features, such as travel sites that provide bargain pricing. However, most existing technology and web sites provide rigid offerings that do little to simplify or automate planning.

SUMMARY OF THE INVENTION

In accordance with the present invention, techniques for dynamic service scheduling are provided. According to particular embodiments, these techniques enable agents to automatically schedule services to fulfill events for tasks designated by a user.

According to a particular embodiment, a method for dynamic service scheduling identifies a template specifying a plurality of events, determines multiple consumer descriptors, accesses a remote service directory having service descriptors for each of a plurality of services, and filters the services from the service directory based on the service descriptors, the events, and the consumer descriptors to determine potential ones of the services for fulfilling the events. The method queries each of the potential services for additional service descriptors, filters the potential services based on the additional service descriptors, the events, and the consumer descriptors to determine selected ones of the services for fulfilling the events, identifies service links for accessing the selected services, and modifies the template to associate the service links with the events. The method also determines whether each of the events in the template has an associated service link and, if each of the events in the template has an associated service link, presents the template for acceptance.

Embodiments of the invention provide various technical advantages. A system operating according to these techniques provides for dynamic composition of services to fulfill tasks. Specifically, these techniques may enable creation of itineraries that link to any number of services for fulfilling events for a user's tasks. This enables automated and dynamic aggregation of services to simplify planning and scheduling of events.

Because of the relatively open nature of interactions between elements, the system may permit any number of entities to design and offer services. Thus, the system may be scalable and extensible. Particular embodiments may operate in accordance with publicly developed communication standards. Also, a wide variety of services and service providers increases flexibility and further enhances the dynamic nature of automated service composition.

The system may support any number of agents acting on behalf of users, service providers, and/or intermediaries to facilitate dynamic service composition. These agents communicate while operating in the interests of their owners to facilitate the access to and scheduling of services. Each agent can operate according to its particular information to accomplish the goals of its owner. For example, a consumer's agent may operate according to a plan while applying user preferences to create a potentially unique itinerary with scheduled services that match to the user's preferences.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
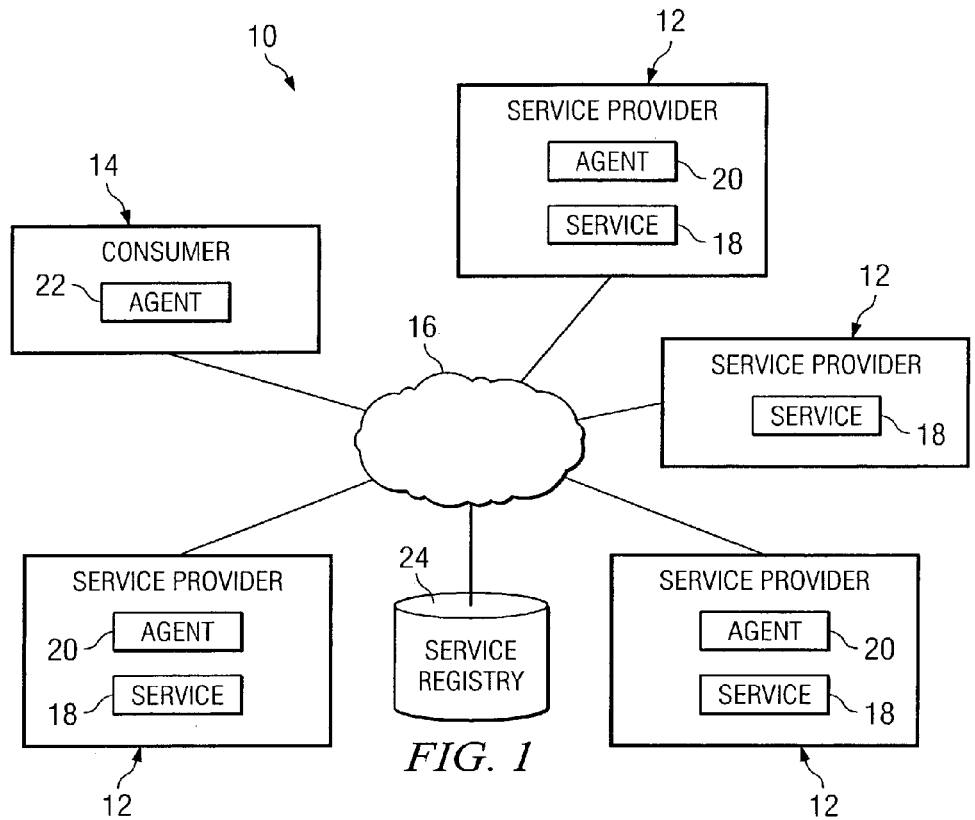
FIG. 1 illustrates a system that includes service providers and consumers that operate according to particular embodiments of the present invention.

FIG. 1 illustrates a system, indicated generally at 10, that includes multiple service providers 12 and a consumer 14 interconnected by a communication network 16. Each service provider 12 offers a service 18, potentially using a service agent 20 to facilitate offering of the service 18 to consumers. Consumer 14 includes a consumer agent 22 that facilitates the dynamic composition of one or more services 18 to fulfill specific tasks. According to particular embodiments, consumer agent 22 interacts with other elements of system 10 to generate a schedule of services 18 that will fulfill particular events according to preferences of consumer 14. For example, consumer agent 22 may interact with multiple service providers 12 to schedule services 18 for a travel itinerary.

Each service provider 12 represents any suitable collection of components capable of offering access to services through defined interfaces. Service providers 12 offer machine readable interfaces that enable structured queries to access and interact with information regarding services 18. For example, a particular service provider 12 may provide access to and interaction with an airline reservation system. To provide these operations, service 18 may support any number of features and provide an interface to each one of these features. For example, for an airline reservation system, service 18 may offer features such as flight availability checks, pricing queries, and reservation requests.

To provide access to features, service 18 makes a description available. This description may provide information of varying specificity, such as generic information describing the nature of service 18, what interface languages service 18 supports, and generically what service 18 can achieve as well as specific information such as precise features offered by service 18 and techniques for interfacing with those features. Using the airline reservation system example, service 18 may include a description with generic information identifying service 18 as an airline reservation system and specifying a language, such as SABRE, supported by service 18. Service 18 may further include specific descriptors identifying particular features and techniques for interfacing with those particular features. According to particular embodiments, service 18 may advertise and operate according to publicly developed and available standards for communications.

To provide extended functionality, service providers 12 may include service agents 20. Service agents 20 can extend functionality offered by service providers 12 by enabling operations such as composition of other services and "pushing" of services to consumers 14. Thus, just as an individual consumer 14, using consumer agent 22, may seek out and compose a number of services 18, service agent 20 can similarly seek out and compose any number of remote services 18. For example, consider service provider 12 offering a travel agent-type service. This travel service agent 20 may seek out other service providers 12, such as car services, airlines, activities, and other suitable types of services 18 and compose these services 18 into a combined service offering. Consumer agent 22 may then access the travel service agent 20 to schedule some or all services 18 for an itinerary. This enables a distribution of functionality and a hierarchical process whereby tasks and subtasks can find and link to services 18 at multiple levels to complete an itinerary.

Service agents 20 may also provide for pushing of services 18 to other service providers 12 and/or consumers 14. For example, service agent 20, using communication network 16, may identify other entities that have expressed an interest in a particular type of service 18. Service agent 20 may then contact these entities and advertise the availability and features supported by service 18.

Consumer 14 represents any suitable combination and arrangement of components that enable interaction with users and other elements of system 10. Consumer 14 supports composition of services 18 into a schedule to fulfill one or more events and/or consumer specified tasks. Within consumer 14, consumer agent 22 handles this dynamic composition of services by interfacing with service providers 12 and other agents. To perform automated service scheduling, consumer 14 maintains a variety of information, such as plans and consumer descriptors. During operation, consumer agent 22 uses information from these plans, such as templates, to build schedules of services. Consumer agent 22 may also apply consumer descriptors during this process to create highly personalized itineraries. At the end of the process, consumer 14 may have a complete itinerary with links to one or more remote services 18 for fulfilling tasks.

To find services, system 10 contemplates consumer agent 22 using any suitable techniques. In the embodiment illustrated, system 10 includes a service registry 24 to aid in finding services 18. According to particular embodiments, service providers 12 register their services 18 with one or more service registries 24. Service registry 24 then provides a centralized guide, similar to a yellow pages, to enable consumers 14 to locate services 18. Service registry 24 may include any suitable information identifying, describing, and providing information for locating services 18. For example, for each registered service 18, service registry 24 may include a high level description, such as generic descriptors from service 18, as well as a network address for contacting service 18. If the general description provided matches to basic criteria set by consumer 14, consumer agent 22 may then contact the identified network address, which then links to any appropriate system within service provider 12, such as service 18 or service agent 20. Consumer agent 22 may then query the contacted service 18 for more detailed information and potentially access the various functions provided by service 18.

To schedule services 18 to fulfill tasks, consumer agent 22 may implement an iterative, template-based process. For this process, consumer agent 22 begins with a template for performing a task and then refines the template over a series of one or more iterations. For example, for a business trip, consumer agent 22 may select a business trip template itinerary that specifies the need for air transportation, ground transportation, and hotel accommodations. In each iteration, consumer agent 22 seeks out services 18 to fulfill unresolved portions of the template. In addition, as previously noted, consumer agent 22 may apply consumer descriptors to personalize the process. For example, consumer agent 22 may apply global and/or generic descriptors, such as award program numbers, in addition to dynamic descriptors, such as dates and current preferences.

With each iteration, consumer agent 22 attempts to further refine and define the itinerary, with a goal of identifying links for each event and/or subtask within the itinerary. During this process, each of the subtasks may further expand based upon information from services 18 and other information, such as consumer descriptors. For example, while attempting to determine a service link for fulfilling an air transportation subtask, consumer agent 22 may identify multiple destinations specified for the trip. Consumer agent 22 may then interact with appropriate services 18 to expand this event into multiple events. Moreover, in this scenario, consumer agent 22, service agents 20, and/or other appropriate entities may dynamically identify alternatives for satisfying these subtasks. For example, for a trip travelling to multiple destinations, service agent 20 may compose various other services 18 to fulfill this task using varying transportation types, such as all air, air and ground, or all ground transportation. Service agent 20 may then offer these various services to consumer agent 22, and consumer agent 22 may then select between various options or generate multiple potential itineraries using the newly discovered service option. This example highlights the flexibility provided by the distributed and dynamic nature of system 10. This flexibility enables agents to identify and automatically exploit opportunities.

At the end of iterative process, consumer agent 22 will typically have one or more "completed" itineraries built from the initial template. These itineraries provide links to one or more remote services 18 that will actually fulfill the identified subtasks. Thus, consumer agent 22 need not actually achieve tasks, but rather may delegate performance of these tasks to services 18. This provides for a distributed system in which any number of service providers 12 can offer and provide services to consumers 14, other service providers 12, and/or other appropriate entities. This enables a "plug and play" environment in which consumers 14 can mix and match services 18 from any number of service providers 12.

As previously noted, consumer agent 22 may access "intermediary" service agents 20 that in turn compose services 18 on behalf of consumer agent 22. Thus, for example, consumer agent 22 may delegate authority for scheduling all travel arrangements to an intermediary service agent 20. The resulting itinerary produced by consumer agent 22 will thus, in this example, provide a link to the intermediary service 18, which in turn links to any number of services 18 for fulfilling subtasks. This can result in a hierarchy of schedules linking to services 18. This can provide many advantages based upon the delegation and distribution of processing among agents. For example, a particular intermediary service agent 20 may have highly sophisticated processing and analysis engines to provide efficient, cost-effective, or otherwise appropriate travel arrangements. Consumer agent 22 may leverage this power by incorporating this packaged service as a service link within a generated schedule.

Thus, the illustration provided and the preceding description present generic elements for implementing a system to enable iterative, template-based construction of itineraries that link to multiple services distributed within a network. However, while the embodiment illustrated includes specific components arranged and operating in particular ways, it should be understood that this illustration, the accompanying description, and all examples given are provided only to aid in clarifying the basic concepts of these techniques, and none of these are intended to limit the scope of these concepts.

Figure 2:
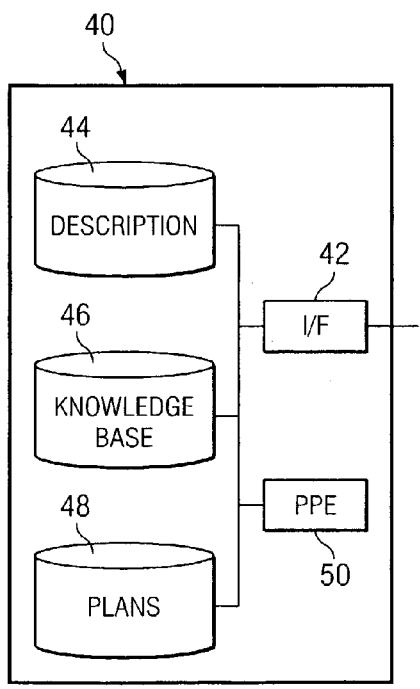
FIG. 2 is a block diagram illustrating components of an agent from the system that can help enable dynamic service scheduling.

FIG. 2 is a block diagram illustrating exemplary functional elements for an agent 40 that includes an interface 42, a description 44, a knowledge base 46, a plan 48, and a plan processing engine 50. Because the operation of many agents, such as service agents 20 and consumer agents 22, may be similar, agent 40 and its elements and operations will be described below both generically and specifically with respect to particular types of agents. In general, agent 40 uses plan processing engine 50 to process information from plans 48 using data contained within description 44 and knowledge base 46 in order to fulfill and/or schedule tasks specified within plans 48.

Plans 48 include, in general, the goals to be achieved by agent 40. If acting on behalf of consumer 14, plans 48 may include one or more itineraries. These itineraries may range from bare templates to completed itineraries. Thus, some plans may specify several tasks in a simple form, whereas other plans may provide more detailed information, up to completed itineraries, which may specify a full set of events and provide links to various services 18 for fulfilling all of the tasks and subtasks associated with these events. Because scheduling tasks for itineraries involves relatively discreet and identifiable operations, agent 40 may represent these itineraries using relatively simple language constructs. For example, an itinerary may potentially include identifiers for tasks, such as transportation, accommodations, activities, destinations, and restaurants. Each of these may further include sub-identifiers, such as air, ground, and water under the transportation identifier. Each of the identifiers and/or sub-identifiers may then link to a remote service 18 and/or may indicate the need for additional refinement or location of additional services 18. For example, the transportation identifier may provide a network address to an intermediate travel agent 20. However, the particular language and identifiers used within itineraries may be chosen from any number of possibilities, and system 10 contemplates agent 40 using itineraries conforming to any appropriate scheme for specifying tasks and subtasks.

When operating on behalf of service provider 12, agent 40 may include different types of information within plans 48. For example, agent 40 may maintain plans 48 for identifying, interacting with, and providing services 18 to consumers 14. As previously discussed, intermediary agents may also compose services 18 in a manner similar to consumer agent 22. Thus, when acting on behalf of service provider 12, plans 48 may contain plans for composing services 18. Thus, for example, plans 48 may contain itineraries expressed in manners similar to those used within consumer agents 22.

Description 44 contains any number of descriptors specifying information associated with the entity served by agent 40. These descriptors can range from general to specific and/or dynamic. Consider agent 40 acting on behalf of consumer 14. Given this relationship, description 44 will include a number of consumer descriptors. These may include general descriptors, such as award program numbers, names, addresses, and other general data. These general descriptors may also include detailed consumer preferences for use during service scheduling. For example, these descriptors may indicate preferences such as types of restaurants, preferred airlines, and any other suitable preferences. Description 44 may further include specific and/or dynamic descriptors focused on particular tasks or types of tasks. For example, for a particular business trip being scheduled, description 44 may include a number of task specific descriptors indicating preferences, constraints, and other suitable types of information for constructing a schedule for the trip.

When operating on behalf of service provider 12, agent 40 maintains information describing services 18 within description 44. This information, as previously noted, may include details ranging from generic down to extremely specific information. Description 44 may include service descriptors identifying a type of service, the service provider, general information regarding the service's operation, how to locate and interface with the service, and other appropriate information. Description 44 may further include service descriptors detailing specific capabilities of service 18, such as precise features supported by service 18 and how to interface with those features. For example, for a restaurant service provider 12, description 44 may include descriptors providing information such as name, location, type of restaurant, price range, interface languages supported, and other appropriate general information. Description 44 may further include specific descriptors identifying features, such as a reservation feature and a take-out order feature, and specify specific syntax for interfacing with these features.

Typically, some or all of description 44 may be exposed to other entities during various operations. When acting on behalf of service provider 12, agent 40 may publish some portion of description 44 into service registry 24. This enables other agents to find and directly contact agent 40 for further information. When acting on behalf of consumer 14, agent 40 may similarly expose some or all of description 44.

Knowledge base 46 includes information for use by agent 40 to make decisions, negotiate with other agents, and perform other operational tasks. When operating on behalf of consumer 14, agent 40 may maintain information such as deal thresholds and other constraints that may be used during negotiations. Similarly, when operating on behalf of service provider 12, knowledge base 46 may include an encoding of business logic. For example, for an airline, knowledge base 46 may include details for pricing of different types of tickets. According to particular embodiments, knowledge base 46 may represent one or more legacy or other enterprise systems maintaining business knowledge for an organization. Thus, agent 40 can access and make decisions based upon actual information within an enterprise, while providing a wrapper of services around this central knowledge bank. Typically, agent 40 maintains most or all of knowledge base 46 hidden from other entities during operation.

Interface 42 provides a link between agent 40 and other entities within system 10. Depending upon the particular types of communications and configurations within system 10, interface 42 may include any suitable combination of hardware and/or logic for interacting with other components.

Plan processing engine 50, as previously discussed, attempts to satisfy goals set forth within plans 48. When operating on behalf of consumer 14, plan processing engine 50 may execute an iterative process focusing on templates within plans 48 to refine those templates into completed schedules. This process may begin with a template loosely specifying a sequence of events and preferences for the events. Plan processing engine 50 applies information from description 44 and knowledge base 46, identifies services 18 for satisfying tasks within the template, and iteratively attempts to refine the template into the completed schedule. In the end, plan processing engine 50 attempts to generate a schedule that links to remote services 18 for fulfilling tasks and subtasks specified for the schedule.

When operating on behalf of service providers 12, plan processing engine 50 may use any suitable techniques for implementing plans 48. According to particular embodiments, selected service providers 12 may aggregate services 18 from multiple service providers 12. In these circumstances, agent 40, acting on behalf of service provider 12, may use a similar iterative, template-based approach to compose a group of services 18 into a single service offering. Agent 40 may then offer this composition of services as a single service 18 to other entities within system 10.

While the embodiment illustrated and the preceding description focus on a particular example of agent 40 that includes specific elements providing particular functions, system 10 contemplates agents 40 having any suitable combination and arrangement of elements to support template-based composition of remote services. Thus, the functionalities performed by the particular elements illustrated may be separated or combined as appropriate, and functionalities of some or all of these elements may be implemented by logic encoded in media. Moreover, some or all of the functionalities of agent 40 may be combined or distributed among other elements of system 10.

Figure 3:
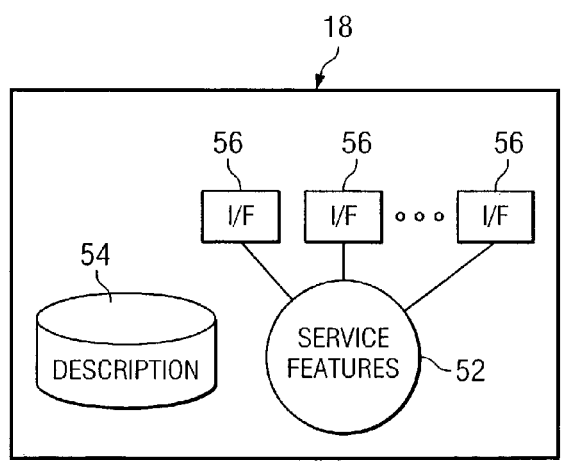
FIG. 3 is a block diagram illustrating functional elements of a service from the system.

FIG. 3 is a block diagram illustrating exemplary functional elements for service 18 that includes service features 52, a description 54, and feature interfaces 56. Service features 52 operate to provide various functions supported by service 18. Feature interfaces 56 enable other entities, such as agent 40, to interface with functions provided by service features 52. Description 54 provides a number of descriptors with information about service 18. For example, description 54 may include information such as that described above with respect to description 44. Thus, description 54 may include information describing service 18, identifying functions provided by service features 52, and detailing mechanisms for accessing and interfacing with feature interfaces 56. Moreover, description 54 may include information shared between service 18 and its associated agent.

During operation, agents and other entities within system 10 may access service 18 to query for information and request service 18 to perform activities. For example, consumer agent 22 may contact service 18 and query information within description 54. In response, service 18 may provide this information to consumer agent 22. This information, as previously discussed, may include descriptors indicating the nature of service 18, capabilities of service 18, general message structures for interfacing with service 18, and other suitable information. The information provided to consumer agent 22 from description 54 may also include details of service features 52 and techniques for accessing and interfacing with feature interfaces 56. For example, consider service 18 providing access to an airline reservation system. In response to a query from consumer agent 22, service 18 may supply descriptors detailing the particular capabilities enabled by service features 52 and specify particular structures and techniques for interfacing with these service features 52 via service interfaces 56. Thus, for example, an airline service 18 may provide information regarding features such as schedule queries, reservation requests, flight information requests, and other appropriate features.

Using this information, consumer agent 22 may access service features 52 using feature interfaces 56. For example, consumer agent 22 may access a flight information interface 56 to determine times and pricing for various flights. If the information satisfies requirements of consumer agent 22, consumer agent 22 can provide a link to service 18 within an itinerary. Later, if a user confirms the itinerary constructed by consumer agent 22, consumer agent 22 can request service 18 to provide the indicated service. For example, consumer agent 22 may access a reservations feature interface 56 to book an actual flight for the user.

Therefore, as provided by this illustration, services 18 may include both functional aspects, such as service features 52 and feature interfaces 56, and data aspects, such as description 54. However, while illustrated as including specific elements arranged in a particular configuration, system 10 contemplates services 18 including any suitable combination and arrangement and elements for providing network accessible services. Thus, system 10 contemplates services 18 including any suitable combination of hardware and/or logic and the functionalities of services 18 being incorporated in and/or provided by any suitable network accessible equipment.

Figure 4:
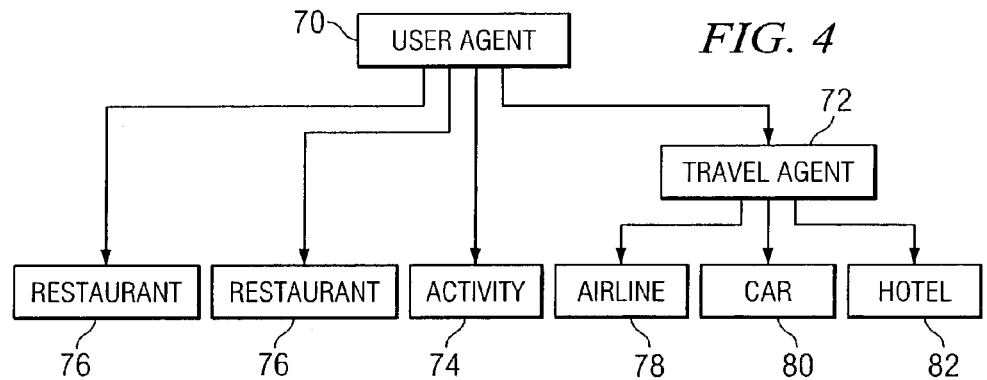
FIG. 4 is a logic diagram illustrating interaction between agents and services within the system.

FIG. 4 is a logic diagram illustrating a hierarchy of services composed to fulfill a travel schedule. The hierarchy illustrates logical links formed in an itinerary generated by a user agent 70. In this illustration, user agent 70 has discovered links to multiple services for fulfilling tasks and/or subtasks within a travel template. These services include restaurant services 72, an activity service 74, and a travel agent 76. Travel agent 76 provides a bundled package of services and thus, in turn, links to an airline service 78, a car service 80, and a hotel service 82.

To form this hierarchy, user agent 70 may initially identify a travel itinerary template specifying a number of events and preferences for some or all of these events. For example, the template may initially specify a home location, a destination, dates, and a level of services to be scheduled. User agent 70 may then implement an iterative refining process to discover and link to any number of services. In this process, user agent 70 may discover travel agent 76 and request travel agent 76 to make all transportation arrangements to satisfy a set of conditions. For example, user agent 70 may search a service registry to discover various agents, including travel agent 76, that can fulfil portions of the travel itinerary template. User agent 70, through communications with one or more of the discovered travel agents, may then select travel agent 76 to fulfil certain tasks. Travel agent 76 may then use a similar iterative, template-based approach to discover and link with airline service 78, car service 80, and hotel service 82.

User agent 70 may also discover and link directly with any number of services, such as restaurant services 76 and activity service 74. Moreover, at any point during processing, user agent 70 may solicit input from a user to aid in refining a schedule. For example, when faced with multiple comparable choices, user agent 70 may present these choices to a user for selection and/or may arbitrarily select one of the choices. In addition, user agent 70 may discover and link to a wide variety of services to fulfill the travel itinerary and then enable the user to remove and/or modify any number of those links. Thus, a hierarchy such as that provided in this illustration may provide a starting point, an intermediary step, and/or a finished schedule. When a schedule is satisfactory to a user, user agent 70 may then initiate services using each of the links within the schedule. For example, user agent 70 may transmit credit card information and authorization for reservations to travel agent 76. Similarly, user agent 70 may request reservations from restaurant services 76 and activity service 74. Therefore, as illustrated by this relatively simple logic model, user agent 70 can process a template to discover one or more links to remote services for fulfilling tasks and subtasks within a schedule. The user agent need not perform any of the actual services, but rather can delegate performance of to the linked services 18.

Figure 5:
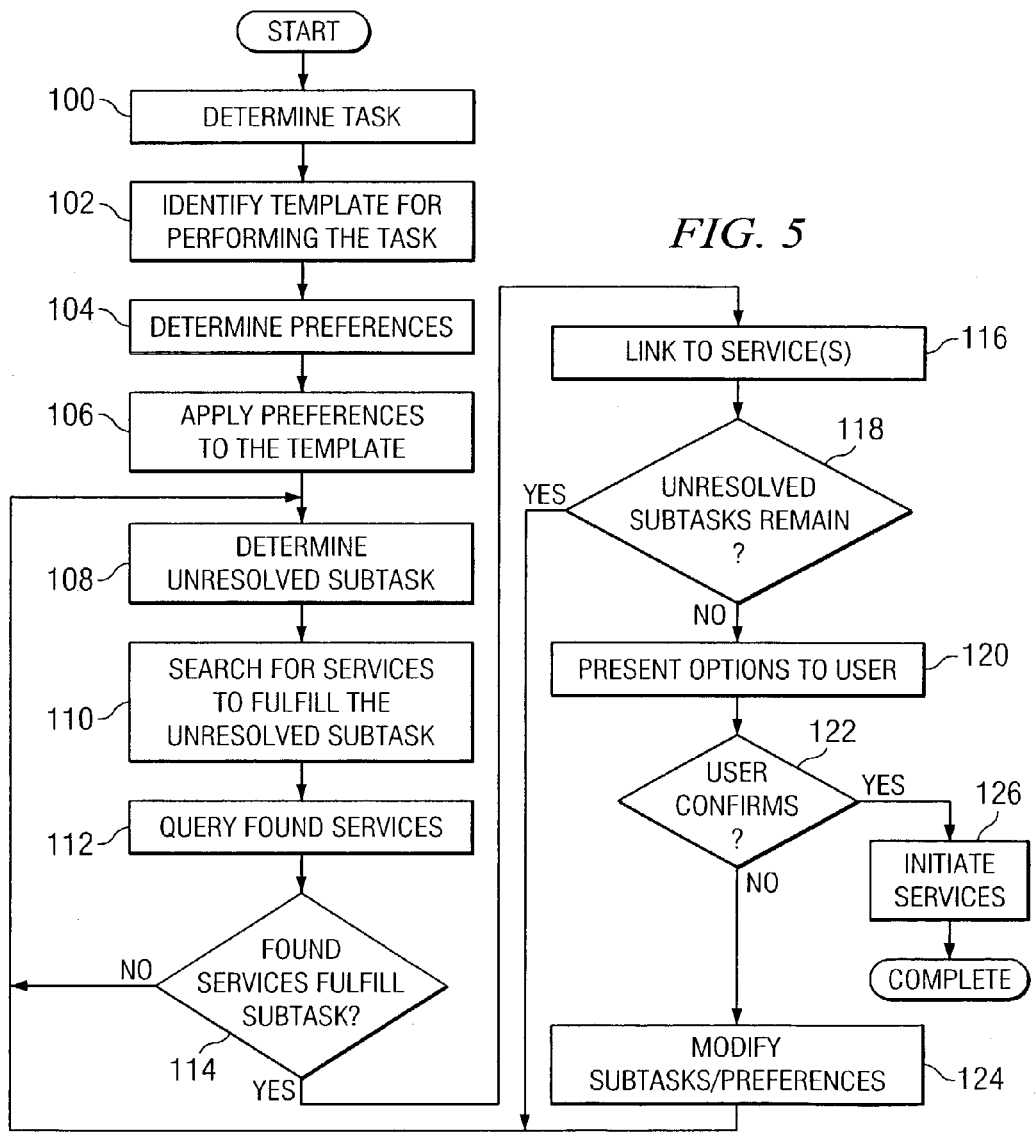
FIG. 5 is a flowchart illustrating a method for scheduling services to perform a task using an iterative approach.

FIG. 5 is a flowchart illustrating a method for consumer agent 22 to perform an iterative, template-based technique for composing services to fulfill tasks and subtasks specified for a schedule. Consumer agent 22 determines a task at step 100. For example, a user may select a particular task, such as a ski vacation, business trip, evening plan, or other suitable task, and indicate this task to consumer agent 22. Consumer agent 22 identifies a template for performing the task at step 102. To identify a template, consumer agent 22 may access any suitable local or remote equipment and perform any appropriate actions. For example, consumer agent 22 may identify one or more locally stored templates for scheduling a ski vacation. Similarly, consumer agent 22 may access remote sites, such as World Wide Web sites, that offer generic and/or specialized templates. As another alternative, consumer agent 22 may build a customized template through interactions with a user. As another alternative, consumer agent 22 may combine these or other appropriate techniques to discover and/or develop a template.

Consumer agent 22 determines preferences of the user at step 104. For example, consumer agent 22 may access a description and/or knowledge base as well as query a user for global and dynamic descriptors applicable to the template and task. Consumer agent 22 applies the preferences to the template at step 106. For example, for any restaurant choices, consumer agent 22 may incorporate preferences that exclude fast food restaurants and restaurants that prohibit smoking.

Consumer agent 22 determines an unresolved subtask at step 108. For example, consumer agent 22 may select an event that has yet to be resolved to a single link to a remote service 18. Consumer agent 22 searches for services 18 to fulfill the unresolved subtasks at step 110. For example, consumer agent 22 may access service registry 24 to identify one or more remote services 18 that may potentially fulfill the unresolved events. Consumer agent 22 then queries the found services 18 at step 112. For example, for each identified service 18, consumer agent 22 may query for additional service descriptors and interact with feature interfaces of service 18 to determine its appropriateness for the subtask. If a found service or services fulfill the subtask at step 114, consumer agent 22 links to the service at step 116. So long as unresolved subtasks remain, consumer agent 22 continues to attempt to refine the template using a similar process. During these iterations, as previously discussed, the tasks and subtasks to be performed by the itinerary may expand or contract based upon information and services provided by other elements within system 10. For example, a request for a restaurant may expand into subtasks requiring transportation and restaurant reservations. Consumer agent 22 may respond to these dynamic process occurrences by continuing to iteratively define and refine the itinerary into a complete set of service links.

After determining links for all subtasks within the template, consumer agent 22 may present one or more options to a user at step 120. For example, user agent 22 may present one or more schedules for fulfilling a ski trip task to the user. If the user does not confirm one of these options, the user may modify subtasks and/or preferences at step 124 and restart the template refinement process. Once a user confirms a completed schedule at step 122, consumer agent 22 may initiate services at step 126. For example, as previously discussed, consumer agent 22 may contact appropriate feature interfaces to initiate and/or authorize services 18 to perform on behalf of consumer 14.

Therefore, the preceding flowchart and accompanying description illustrate a brief method for consumer agent 22 to provide automated service composition using a template-based approach. However, the preceding flowchart and accompanying description illustrate only an exemplary method of operation, and system 10 contemplates agents and/or other suitable components using any appropriate techniques to provide these functionalities. Thus, many of the steps in this flowchart may take place simultaneously and/or in different orders than as shown. In addition, agents may use methods with additional steps, fewer steps, and/or different steps, so long as the methods remain appropriate.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A non-transitory computer readable medium encoded with instructions for dynamic service scheduling, the instructions operable when executed to perform the steps of:
    identifying a template specifying a plurality of unfulfilled events associated with an unaccomplished task designated by a user, wherein each of the events define a subtask to be completed dynamically to accomplish the task;
    determining a plurality of consumer descriptors, wherein each consumer descriptor comprises predetermined consumer preferences for use during service scheduling;
    accessing a remote service directory having service descriptors for each of a plurality of services;
    for each of the events:
        filtering the services from the service directory based on the service descriptors, the event, and the consumer descriptors to determine potential ones of the services for fulfilling the event;
        querying each of the potential services for additional service descriptors;
        filtering the potential services based on the additional service descriptors, the event, and the consumer descriptors to determine selected ones of the services for fulfilling the event;
        identifying service links for accessing the selected services; and
        modifying the template to associate the service links with the event; and
    presenting the completed template for acceptance,
    wherein for each of the potential services, the additional service descriptors comprise a plurality of interface descriptors each identifying a feature of the potential service and a format for interfacing with the feature; and
    wherein each of the service links points to a particular feature of the identified service and specifies a command for accessing the particular feature.

2. The non-transitory computer readable medium of claim 1, wherein the consumer descriptors include global descriptors applicable across multiple templates and dynamic descriptors specifying constraints for one or more of the events.

3. The non-transitory computer readable medium of claim 1, further operable when executed to perform the steps of:
    identifying an additional event based on a query to one of the potential services;
    modifying the template to include the additional event;
    accessing the remote service directory;

filtering the services from the service directory based on the service descriptors, the additional event, and the consumer descriptors to determine potential ones of the services for fulfilling the additional event;

querying each of the potential services for fulfilling the additional event for additional service descriptors;

filtering the potential services for fulfilling the additional event based on the additional service descriptors, the additional event, and the consumer descriptors to determine one of the services for fulfilling the additional event;

identifying a service link for accessing the determined service for fulfilling the additional event; and modifying the template to associate the identified service link with the additional event.

4. The non-transitory computer readable medium of claim 1, further operable when executed to perform the steps of receiving an acceptance of the template and, in response, accessing each of the selected services using the service links to request performance of the services.

5. The non-transitory computer readable medium of claim 4, further operable when executed to perform the step of communicating payment information to at least one of the selected services.

6. The non-transitory computer readable medium of claim 1, wherein the template comprises a text based file.

7. The non-transitory computer readable medium of claim 1, wherein the template specifies events for a travel itinerary that includes an air transportation event, a lodging event, a ground transportation event, and a plurality of activities.

8. The non-transitory computer readable medium of claim 1, wherein the steps of accessing the remote service directory and querying the potential services each involve communications conforming to a publicly defined protocol.

* * * * *